US012265268B2

(12) United States Patent
Keith et al.

(10) Patent No.: US 12,265,268 B2
(45) Date of Patent: Apr. 1, 2025

(54) GENDER CHANGEABLE MULTI-FIBER FIBER OPTIC CONNECTOR

(71) Applicant: COMMSCOPE TECHNOLOGIES LLC, Hickory, NC (US)

(72) Inventors: Scott Martin Keith, Plano, TX (US); Bradley Scott Billman, Sachse, TX (US)

(73) Assignee: CommScope Technologies LLC, Hickory, NC (US)

( * ) Notice: Subject to any disclaimer, the term of this patent is extended or adjusted under 35 U.S.C. 154(b) by 312 days.

(21) Appl. No.: 17/792,906

(22) PCT Filed: Jan. 15, 2021

(86) PCT No.: PCT/US2021/013641
§ 371 (c)(1),
(2) Date: Jul. 14, 2022

(87) PCT Pub. No.: WO2021/146560
PCT Pub. Date: Jul. 22, 2021

(65) Prior Publication Data
US 2023/0069745 A1 Mar. 2, 2023

Related U.S. Application Data

(60) Provisional application No. 62/962,512, filed on Jan. 17, 2020.

(51) Int. Cl.
*G02B 6/38* (2006.01)
(52) U.S. Cl.
CPC ......... *G02B 6/3882* (2013.01); *G02B 6/3831* (2013.01)
(58) Field of Classification Search
CPC ...................................................... G02B 6/38
(Continued)

(56) References Cited

U.S. PATENT DOCUMENTS 4,588,257 A * 5/1986 Maranto .............. G02B 6/3897
385/71
5,245,683 A * 9/1993 Belenkiy .............. G02B 6/3849
385/86
(Continued)

FOREIGN PATENT DOCUMENTS

WO 2016/053851 A1 4/2016
WO 2016/053852 A1 4/2016
WO 2018/032239 A1 2/2018

OTHER PUBLICATIONS

International Search Report and Written Opinion of the International Searching Authority for International Patent Application No. PCT/US2021/013641 mailed May 4, 2021, 9 pages.
(Continued)

*Primary Examiner* — Kaveh C Kianni
(74) *Attorney, Agent, or Firm* — Merchant & Gould P.C.

(57) ABSTRACT

A multi-fiber fiber optic connector is provided having features that allow for changeability with respect to gender. A pin retention structure is configured to retain a pair of alignment pins and includes a pin-holder body with a pair of pin openings and a U-shaped spring clip. The spring clip including a base portion and two opposing legs, and is movable between a pin retaining position and a pin release position. When the spring clip is in the pin retaining position, the two opposing legs engage with outer sides of each of the alignment pins, and when the spring clip is in the pin release position, the base portion flexes inwardly and the two opposing legs disengage with the outer sides of each of the alignment pins.

19 Claims, 5 Drawing Sheets

(58) Field of Classification Search
USPC .......................................................... 385/78
See application file for complete search history.

(56) References Cited

U.S. PATENT DOCUMENTS

| | | | |
|---|---|---|---|
| 6,450,697 B1 | 9/2002 | Ngo | |
| 7,036,993 B2 | 5/2006 | Luther et al. | |
| 7,717,625 B2 | 5/2010 | Margolin | |
| 8,491,199 B1* | 7/2013 | Dang | G02B 6/3821 |
| | | | 385/87 |
| 8,636,424 B2 | 1/2014 | Kuffel et al. | |
| 8,678,670 B2 | 3/2014 | Takahashi et al. | |
| 9,091,825 B2 | 7/2015 | Takahashi et al. | |
| 9,411,101 B2 | 8/2016 | Takahashi et al. | |
| 9,442,256 B2 | 9/2016 | Kuffel et al. | |
| 9,638,872 B2 | 5/2017 | Kuffel et al. | |
| 9,684,139 B2 | 6/2017 | Chang et al. | |
| 9,778,425 B2 | 10/2017 | Nguyen et al. | |
| 9,798,094 B2 | 10/2017 | Kuffel et al. | |
| 9,817,194 B2 | 11/2017 | Childers et al. | |
| 9,823,424 B2 | 11/2017 | Krawczyk et al. | |
| 9,977,199 B2 | 5/2018 | Chang et al. | |
| 10,114,179 B2 | 10/2018 | Kamada et al. | |
| 10,197,746 B2 | 2/2019 | Childers et al. | |
| 10,215,932 B2 | 2/2019 | Childers et al. | |
| 10,901,155 B2 | 1/2021 | Lu | |
| 2012/0281951 A1 | 11/2012 | Takahashi et al. | |
| 2013/0216185 A1 | 8/2013 | Klavuhn et al. | |
| 2017/0102505 A1 | 4/2017 | Nguyen et al. | |
| 2017/0176691 A1 | 6/2017 | Childers et al. | |
| 2017/0176694 A1 | 6/2017 | Childers et al. | |
| 2017/0285277 A1 | 10/2017 | Chang et al. | |
| 2017/0315308 A1 | 11/2017 | Kamada et al. | |
| 2018/0239093 A1 | 8/2018 | Chang et al. | |
| 2019/0162918 A1 | 5/2019 | Childers et al. | |
| 2019/0384017 A1* | 12/2019 | Lu | G02B 6/3882 |
| 2021/0191051 A1* | 6/2021 | Chang | G02B 6/3885 |

OTHER PUBLICATIONS

MPO Series: New MPO Multi-Function Connectors, Suncall America, Inc, 1 page (Admitted Prior Art as of Jan. 17, 2020).

* cited by examiner

GENDER CHANGEABLE MULTI-FIBER FIBER OPTIC CONNECTOR

CROSS-REFERENCE TO RELATED APPLICATION

This application is a National Stage Application of PCT/US2021/013641, filed on Jan. 15, 2021, which claims the benefit of U.S. Patent Application Ser. No. 62/962,512, filed on Jan. 17, 2020, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to multi-fiber fiber optic connectors.

BACKGROUND

A multi-fiber fiber optic connector, for example an MPO (Multi-Fiber Push On) connector, typically includes a connector body supporting a multi-fiber ferrule at a front end and a connector boot at a rear end. Typically, an outer release-sleeve (e.g., a grip-sleeve) is mounted on the connector body. The outer release-sleeve is slideable relative to the connector body and is spring biased toward a forward position. When the multi-fiber fiber optic connector is inserted into a corresponding fiber optic adapter, the release-sleeve covers latches of the fiber optic adapter to retain the latches in latched positions relative to the connector body such that the fiber optic connector is prevented from being withdrawn from the adapter. By pulling back on the release-sleeve, the release-sleeve is displaced from the latches of the fiber optic adapter such that the latches can flex outwardly to unlatched positions in which multi-fiber fiber optic connector can be withdrawn from the fiber optic adapter.

An MPO connector can either be male or female. A male MPO connector includes two alignment pins that project forwardly from the multi-fiber ferrule of the connector. A female MPO connector includes alignment openings within the multi-fiber ferrule adapted to receive the alignment pins of a mating male MPO connector. The ability to change genders between male and female MPO connectors in the field is desirable.

MPO connectors typically include a key integrated with the connector housing for determining the polarity of the fiber optic connectors. Depending on the fiber optic system into which the MPO connector is intended to be incorporated, it may be required to have a key on either a bottom side or a top side of the fiber optic connector. The ability to change polarity of the MPO connector in the field is also desirable.

SUMMARY

One aspect of the present disclosure relates to a fiber optic connector including: a connector body having a front end, a rear end, opposing major sides, and opposing minor sides, the connector body defining a longitudinal axis extending between the front end and the rear end; a multi-fiber ferrule disposed within the connector body and biased towards the front end of the connector body, the multi-fiber ferrule including a front end, a rear end, a plurality of fiber openings for receiving optical fibers, and a pair of alignment pin openings that extend between the front end and the rear end; a main grip-sleeve body mounted on the connector body and movable relative to the connector body along the longitudinal axis between a forward position and a rearward position; a pair of alignment pins selectively mountable in the pair of alignment pin openings of the multi-fiber ferrule, each alignment pin has a circumferential groove defined adjacent a rear end of the alignment pin; and a pin retention structure disposed within the connector body and positioned at the rear end of the multi-fiber ferrule, the pin retention structure configured to retain the pair of alignment pins within the pair of alignment pin openings, the pin retention structure including: a pin-holder body having a front end disposed adjacent the rear end of the multi-fiber ferrule and a pair of pin openings extending from the front end for receiving the rear ends of the pair of alignment pins; and a U-shaped spring clip disposed within the pin-holder body, the spring clip including a base portion and two opposing legs extending from the base portion, the spring clip movable relative to the pin-holder body between a pin retaining position and a pin release position, wherein when the spring clip is in the pin retaining position, the base portion is bowed such that a concave surface faces the longitudinal axis, and the two opposing legs engage with outer sides of each of the alignment pins relative to the longitudinal axis and at the circumferential groove, and wherein when the spring clip is in the pin release position the base portion flexes inwardly towards the longitudinal axis, and the two opposing legs disengage with the outer sides of each of the alignment pins.

In an example, the pin-holder body further includes a slot proximate the front end of the pin-holder body, and a pair of shoulders are disposed within the slot, and the pair of shoulders form pivot points for the two opposing legs of the spring clip when moving between the pin retaining position and the pin release position. In another example, the spring clip is biased toward the pin retaining position. In yet another example, the spring clip is completely disposed within the pin-holder body in both the pin retaining position and the pin release position. In still another example, at least one of the major sides of the connector body defines a tool access opening that is aligned with at least a portion of the base portion of the spring clip when disposed within the connector body. In an example, the tool access opening is centered between the minor sides of the connector body.

In another example, at least one of the major sides of the connector body includes a key mounting slot extending from the front end and along the longitudinal axis, the key mounting slot configured to selectively receive a key that defines a polarity of the fiber optic connector, and the tool access opening is disposed within the key mounting slot. In yet another example, the connector further includes a key that defines a key opening configured to align with the tool access opening. In still another example, the tool access opening is accessible when the main grip-sleeve body is in both the forward position and the rearward position.

Another aspect of the present disclosure relates to a fiber optic connector including: a connector body extending along a longitudinal axis and including opposing major sides and opposing minor sides, wherein at least one of the opposing major sides defines a tool access opening that at least partially defines a tool path; a multi-fiber ferrule disposed within the connector body and including left and right alignment pin openings that extend along the longitudinal axis; a main grip-sleeve body slidably mounted on the connector body and rearward of the tool access opening; left and right alignment pins mountable in the left and right alignment pin openings of the multi-fiber ferrule; and a pin retention structure disposed within the connector body, the pin retention structure including: a pin-holder body defining left and right pin openings configured to receive a rear end of the left and right alignment pins; and a U-shaped spring clip having a base portion and left and right legs for selectively retaining the left and right alignment pins, the spring clip moveable relative to the pin-holder body between a pin retaining position and a pin release position, the base portion is at least partially disposed within the tool path and flexes inwardly towards the longitudinal axis upon inserting a tool within the tool path to move the left and right legs to the pin release position and in a direction away from the longitudinal axis and towards the minor sides of the connector body.

In an example, the base portion of the spring clip is bowed with a concave surface facing the longitudinal axis. In another example, the tool path is approximately centered between the opposing minor sides, and is substantially orthogonal to the longitudinal axis. In yet another example, the pin-holder body defines a slot that receives the spring clip, and the left and right pin alignment openings extend through the slot.

Another aspect of the present disclosure relates to a fiber optic connector including: a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a central longitudinal axis that extends between the front and rear ends; a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least one of the fiber openings being arranged in a row that extends along the major dimension of the multi-fiber ferrule, the multi-fiber ferrule being movable relative to the connector body along the central longitudinal axis of the connector body, the multi-fiber ferrule defining left and right alignment pin openings that extend along the central longitudinal axis of the connector body when the multi-fiber ferrule is positioned within the connector body; a spring stop mounted within the rear end of the connector body; a ferrule spring for biasing the multi-fiber ferrule in a forward direction relative to the connector body, the ferrule spring being located within the connector body and being captured between the spring stop and the multi-fiber ferrule; a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being movable relative to the connector body along the central longitudinal axis of the connector body between a forward position and a rearward position; left and right alignment pins mountable in the left and right alignment pin openings of the multi-fiber ferrule, wherein when the left and right alignment pins are mounted within the multi-fiber ferrule within the connector body, the left and right alignment pins include inner surfaces that face towards each other and toward the central longitudinal axis, and the left and right alignment pins also include outer surfaces that face away from one another and away from the central longitudinal axis, the left and right alignment pins further including circumferential grooves defined adjacent rear ends of the left and right alignment pins; and a pin retention structure positioned at a rear end of the multi-fiber ferrule for retaining the left and right alignment pins within the left and right alignment pin openings, the pin retention structure including: a pin-holder body; and a U-shaped spring clip for retaining the left and right alignment pins in the left and right alignment pin openings, the spring clip including a base portion extending along the major dimension of the multi-fiber ferrule and left and right legs extending along the minor dimension of the multi-fiber ferrule, the spring clip being movable relative to the pin-holder body between a pin retaining position and a pin release position, the spring clip biased toward the pin retaining position, the left and right legs being positioned and configured to fit within the circumferential grooves of the alignment pins when the alignment pins are installed within the alignment pin openings, the left and right legs being adapted to fit within the circumferential grooves at the outer surfaces of the alignment pins, the base portion being positioned outwardly relative to the central longitudinal axis, wherein the base portion flexes inwardly relative to the central longitudinal axis to move the left and right legs from the pin retaining position to the pin release position and outwardly relative to the central longitudinal axis.

In an example, the pin-holder body includes a front end, a rear end, and left and right pin openings extending from the front end towards the rear end and configured to receive the rear ends of the alignment pins, the pin-holder body also includes a slot proximate the front end that receives the spring clip. In another example, the pin-holder body includes a pair of shoulders disposed within the slot, the pair of shoulders engage with inner corners of the U-shaped spring clip, wherein the left and right legs pivot about the pair of shoulders when moving between the pin retaining position and the pin release position. In yet another example, the fiber optic connector includes a tool path extending from a tool access opening defined by one of the upper or lower major sides of the connector body to the base portion of the spring clip. In still another example, the tool path extends through a key opening defined by a key mounted to the connector body. In an example, the tool path includes a counter-bore within the pin-holder body. In another example, the tool path is uncovered when the main grip-sleeve body is in the forward position and the rearward position.

A variety of advantages of the disclosure will be set forth in part in the description that follows, and in part will be apparent from the description, or may be learned by practicing the various aspects of the present disclosure. It is to be understood that both the forgoing general description and the following detailed description are exemplary and explanatory only and are not restrictive of the broad inventive concepts upon which the examples are based.

DETAILED DESCRIPTION

MPO connectors are generally configured as either "male" and having two protruding alignment pins, or "female" having two holes for receiving the alignment pins so as to ensure fiber channel connections. This gender of the MPO connector is typically established during initial assembly of the connector, however, it is desirable to change the gender of the MPO connector after assembly is complete. To perform this function, the alignment pins must be either removed or installed depending on which gender is required or desired.

The pin retention structures described herein enable the alignment pins to be inserted into a female connector such that they are securely held in position, or with the use of a tool, the pins can easily be removed from a male connector without disassembling the MPO connector. The pin retentions structure includes a pin-holder body and a U-shaped spring clip that is housed inside the connector and forms a releasable latch that can selectively engage with features on the alignment pins to hold them in place. To remove the alignment pins, a tool can be inserted through a tool path defined in the outer housing of the connector to flex the spring clip so that the pins are released and removable. In the example, the spring clip is shaped so as to engage outer surfaces of the alignment pins and enable the tool to apply a flexing force at a single location on a base portion to release both the left and right pins substantially simultaneously. As such, only a single tool path needs to be formed within the MPO connector, however, the tool path may be formed on both a top and bottom of the connector as required or desired. Furthermore, the tool path is positioned so that outer housing components do not cover the path. Inserting and removing the alignment pins can be performed multiple times as required or desired.

Figure 1:
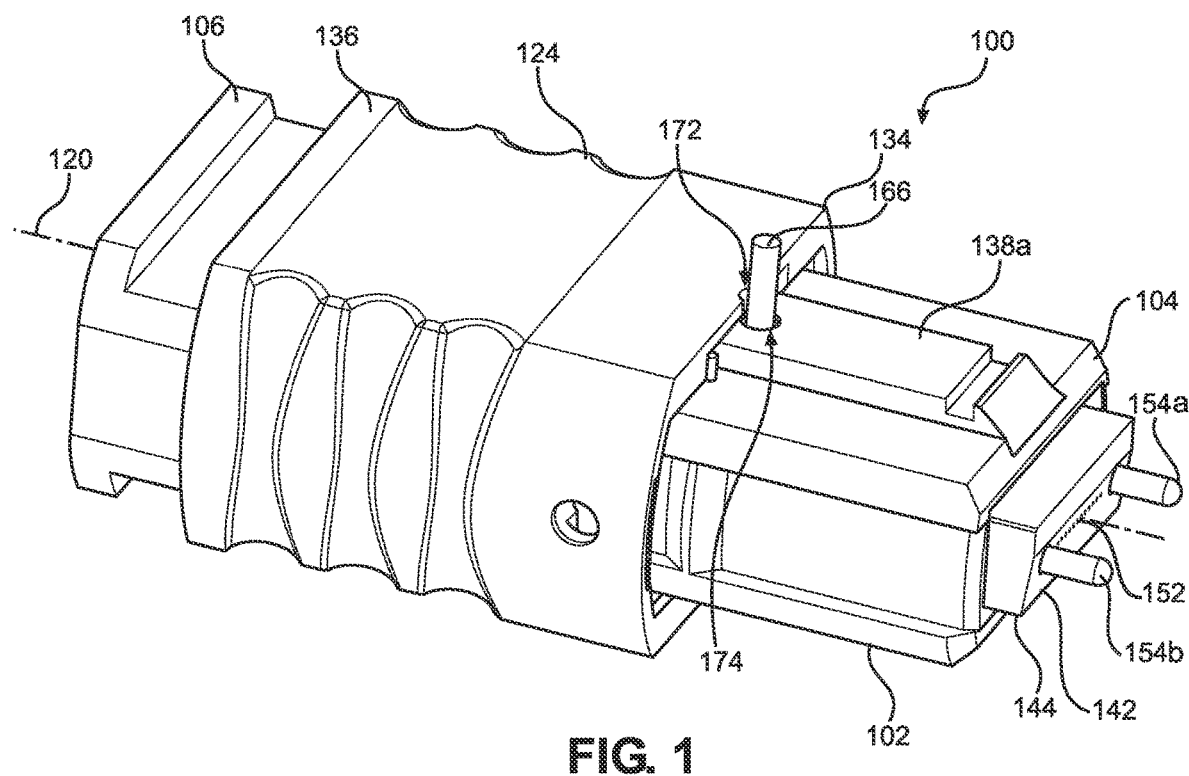
FIG. 1 is a front, top, right perspective view of a multi-fiber fiber optic connector in accordance with the principles of the present disclosure.
Figure 2:
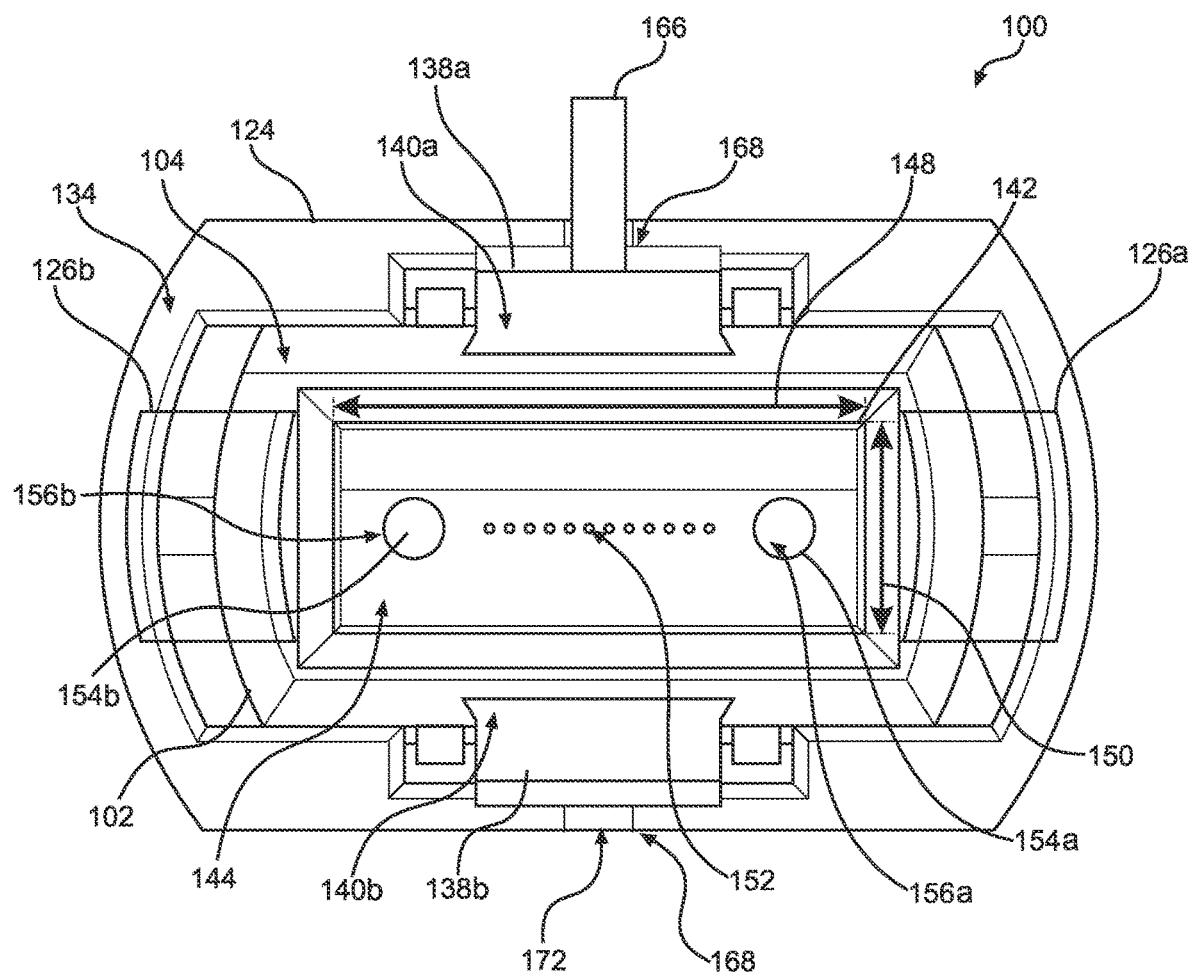
FIG. 2 is a front view of the multi-fiber fiber optic connector of FIG. 1.
Figure 3:
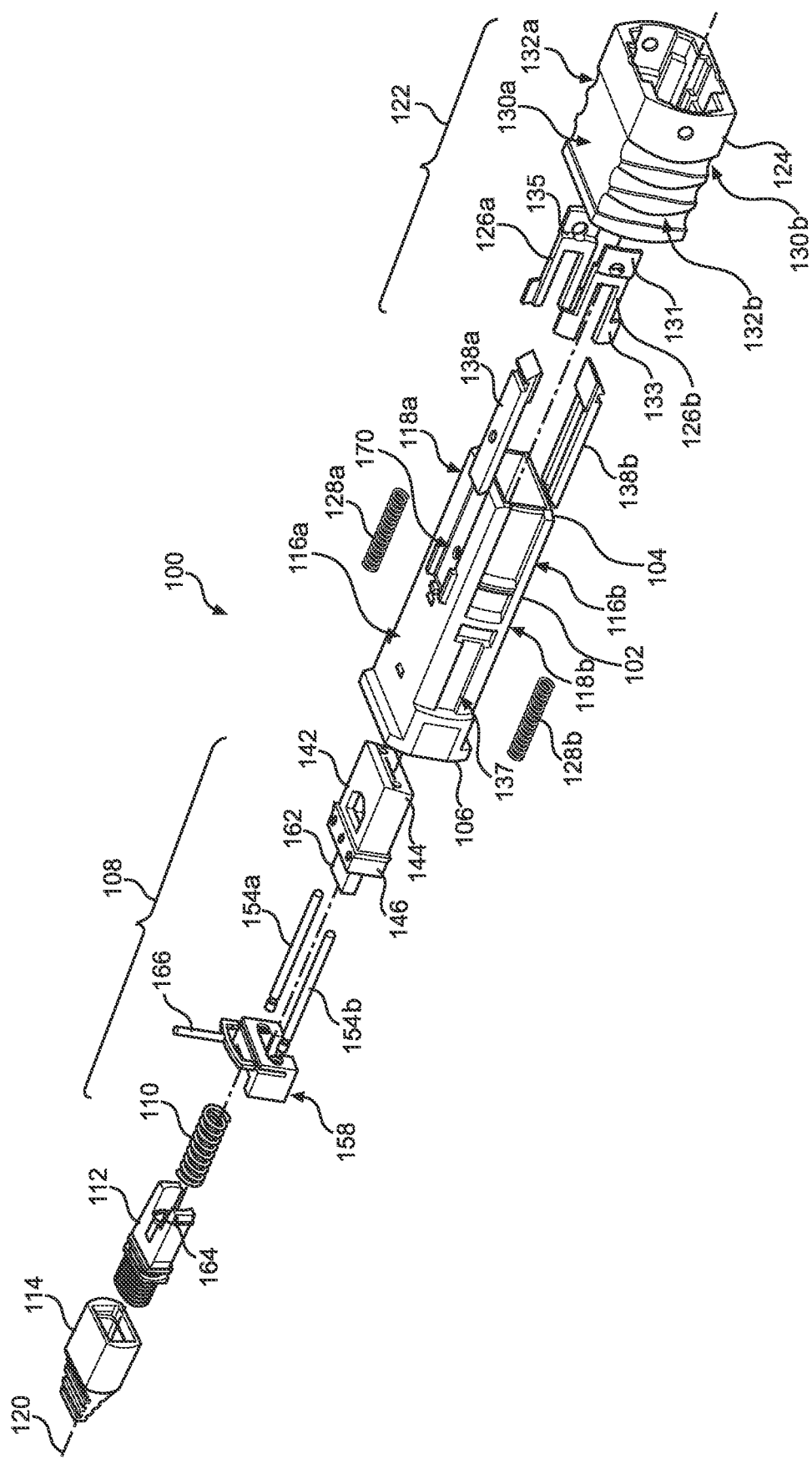
FIG. 3 is an exploded view of the multi-fiber fiber optic connector of FIG. 1.

FIG. 1 is a front, top, right perspective view of a multi-fiber fiber optic connector 100 in accordance with the principles of the present disclosure. FIG. 2 is a front view of the multi-fiber fiber optic connector 100. FIG. 3 is an exploded view of the multi-fiber fiber optic connector 100. Referring concurrently to FIGS. 1-3, the multi-fiber fiber optic connector 100 has enhanced functionality at least relating to the ability to easily to change gender of the connector. Additionally, the multi-fiber fiber optic connector 100 as enables polarity to be changed and for operation as a true push-pull fiber optic connector (e.g., a true push-pull MPO connector). A true push-pull fiber optic connector is a connector in which the outer grip sleeve can be grasped during both insertion of the connector into a fiber optic adapter and during removal of the connector from the fiber optic adapter. The structure that enables the polarity to be changed and for push-pull functionality is further described in U.S. patent application Ser. No. 16/445,487, filed Jun. 19, 2019, and incorporated by reference herein in its entirety.

In the example, the multi-fiber fiber optic connector 100 includes a connector body 102 having a front end 104 and an opposite rear end 106. A ferrule assembly 108 of the multi-fiber fiber optic connector 100 is configured to mount within an interior of the connector body 102. A spring 110 of the multi-fiber fiber optic connector 100 is configured to bias the ferrule assembly 108 in a forward direction relative to the connector body 102. The multi-fiber fiber optic connector 100 also includes a rear spring stop 112 configured to mount within the rear end 106 of the connector body 102. The rear spring stop 112 is configured to retain the spring 110 within the connector body 102. A rear connector boot 114 is configured to mount to a rear end of the rear spring stop 112. The rear connector boot 114 can have a flexible configuration for providing optical fiber bend radius protection and strain relief at the rear end of the multi-fiber fiber optic connector 100. It will be appreciated that in use, the connector 100 mounts at the end of a fiber optic cable, and the boot 114 preferably provides flexible support where the cable enters the rear of the connector.

The connector body 102 includes opposite upper and lower major sides 116a, 116b that extend lengthwise between the front end 104 and the rear end 106. Additionally, the connector body 102 includes opposite left and right minor sides 118a, 118b that extend between the upper and lower major sides 116a, 116b and extend lengthwise between the front end 104 and the rear end 106. The connector body 102 defined a longitudinal axis 120 that extends between the front end 104 and the rear end 106.

The multi-fiber fiber optic connector 100 further includes an outer grip-sleeve assembly 122 configured to mount over the connector body 102. The outer grip-sleeve assembly 122 includes a main grip-sleeve body 124 and separate left and right adapter latch locks 126a, 126b. Left and right grip-sleeve assembly springs 128a, 128b are used to bias the outer grip-sleeve assembly 122 in a forward direction when the outer grip-sleeve assembly 122 is mounted on the connector body 102. The main grip-sleeve body 124 includes opposite upper and lower major sides 130a, 130b that respectively oppose the upper and lower major sides 116a, 116b of the connector body 102. Additionally, the main grip-sleeve body 124 includes opposite left and right minor sides 132a, 132b that extend between the upper and lower major sides 130a, 130b and that respectively oppose the left and right minor sides 118a, 118b of the connector body 102. The main grip-sleeve body 124 also includes a front end 134 and a rear end 136 and extends along the longitudinal axis 120.

The left and right minor sides 132a, 132b of the main grip-sleeve body 124 extend all the way to the front end 134 such that all of the sides 130, 132 of the body 124 terminate on the same front end plane. In the example, no notches formed at the front end of the minor sides 132a, 132b. The interior of the main grip-sleeve body 124 also includes structure for guiding and stopping movement of the left and right adapter latch locks 126a, 126b relative to the main grip-sleeve body 124. The left and right adapter latch locks 126a, 126b respectively mount at the left and right minor sides 132a, 132b of the main grip-sleeve body 124. When mounted within the main grip-sleeve body 124, the left and right adapter latch locks 126a, 126b are movable along the longitudinal axis 120 relative to the main grip-sleeve body 124 between forward positions and rearward positions. In the example, the left and right adapter latch locks 126a, 126b are separate pieces that are moveable relative to each other along the longitudinal axis 120 of the connector body 102 and are also movable relative to the main grip-sleeve body 124 along the longitudinal axis 120. The left and right adapter latch locks 126a, 126b each are completely disposed within the main grip-sleeve body 124 and between the front end 134 and the rear end 136.

In certain aspects, each adapter latch lock 126 can include a cover portion 131 that is positioned within the left and right minor sides 132a, 132b of the main grip-sleeve body 124. In the example, the cover portion 131 is enclosed by the main grip-sleeve body 124. The adapter latch locks 126a, 126b also includes elongate rear guide portions 133 that extend rearwardly from the cover portions 131. The rear guide portions 133 are adapted to fit and slide within corresponding guide recesses (not shown) defined in the interior sides of the left and right minor sides 132a, 132b of the main grip-sleeve body 124. The adapter latch locks 126a, 126b further include top-hat shaped portions 135 that are inwardly offset from the cover portion 131 and the rear guide portion 133. Each top-hat shaped portion 135 can function as positive stops for limiting forward movement of the adapter latch locks 126a, 126b relative to the main grip-sleeve body 124. Additionally, each top-hat shaped portion 135 form spring stops for the left and right grip-sleeve assembly springs 128a, 128b so as to allow the springs 128a, 128b to bias the adapter latch locks 126a, 126b in a forward direction relative to the main grip-sleeve body 124.

The left and right grip-sleeve assembly springs 128a, 128b respectively mount within left and right spring grooves 137 defined by the connector body 102 on the left and right minor sides 118a, 118b. The main grip-sleeve body 124 is slidably mounted on the connector body 102 and is movable relative to the connector body 102 along the longitudinal axis 120 between a forward position (e.g., illustrated in FIG. 1) and a rearward position (e.g., a position further towards the rear end 106 of the connector body 102). The grip-sleeve assembly springs 128 bias the main grip-sleeve body 124 in its forward positon. Additionally, the left and right grip-sleeve assembly springs 128a, 128b function to bias the left and right adapter latch locks 126a, 126b to forward positions relative to the main grip-sleeve body 124. However, the adapter latch locks 126 can move relative to the main grip-sleeve body 124 so that in operation, the outer grip-sleeve assembly 122 enables the true push-pull functionality of the multi-fiber fiber optic connector 100.

The multi-fiber fiber optic connector 100 further includes upper and lower keys 138a, 138b adapted to be slidably mounted respectively at the upper and lower major sides 116a, 116b of the connector body 102 and adjacent the front end 104 of the connector body 102. The connector body 102 includes structure for accommodating the upper and lower keys 138a, 138b. In the example, the upper and lower keys 138a, 138b respectively slidably mount to the upper and lower major sides 116a, 116b of the connector body 102. The upper and lower keys 138a, 138b each are slidably movable along the longitudinal axis 120 relative to the connector body 102 between forward and rearward positions. To accommodate sliding movement of the upper and lower keys 138a, 138b, the connector body 102 defines upper and lower longitudinal key mounting slots 140a, 140b that extend longitudinally along the connector body 102 in a rearward direction from the front end 104 of the connector body 102. In operation, the selective mounting of the upper and lower keys 138a, 138b enables the polarity of the multi-fiber fiber optic connector 100 to be changed as required or desired.

The ferrule assembly 108 of the multi-fiber fiber optic connector 100 includes a multi-fiber ferrule 142 that is positioned within the connector body 102 adjacent the front end 104 of the connector body 102 when the ferrule assembly 108 has been installed within the connector body 102. The multi-fiber ferrule 142 has a front end 144 and an opposite rear end 146, and an elongate transverse cross-sectional profile defining perpendicular major and minor dimensions 148, 150 relative to the longitudinal axis 120 (shown FIG. 2). With the multi-fiber ferrule 142 installed in the connector body 102, the major dimension 148 extends between the left and right minor sides 118a, 118b of the connector body 102 and the minor dimension 150 extends between the upper and lower major sides 116a, 116b of the connector body 102. The multi-fiber ferrule 142 defines a plurality of fiber openings 152 for receiving optical fibers corresponding to a fiber optic cable which is terminated by the multi-fiber fiber optic connector 100. At least some of the fiber openings 152 are arranged in a row that extends along the major dimension 148 of the multi-fiber ferrule 142.

The multi-fiber ferrule 142, when installed in the connector body 102, is movable relative to the connector body 102 along the longitudinal axis 120 and is spring biased toward a forward position relative to the connector body 102 by the ferrule biasing spring 110. The ferrule assembly 108 also includes left and right ferrule alignment pins 154a, 154b that mount within corresponding left and right alignment pin openings 156a, 156b in the multi-fiber ferrule 142 when the multi-fiber fiber optic connector 100 is configured as a male connector. The left and right alignment pin openings 156a, 156b extend between the front end 144 and the rear end 146 of the multi-fiber ferrule 142 and along the longitudinal axis 120. When the ferrule alignment pins 154a, 154b are selectively mounted within the alignment pin openings 156a, 156b, the ferrule alignment pins 154a, 154b are retained within the alignment pin openings 156a, 156b by a pin retention structure 158 (e.g., a pin retention arrangement) that mounts at the rear end 146 of multi-fiber ferrule 142.

The pin retention structure 158 is disposed within the connector body 102. In certain examples, the pin retention structure 158 is held against the rear end 146 of the multi-fiber ferrule 142 by the ferrule biasing spring 110. In the example, the ferrule alignment pins 154a, 154b include circumferential grooves 160 (shown FIG. 4) adjacent rear ends of the ferrule alignment pins 154a, 154b which are engaged by the pin retention structure 158 to retain the ferrule alignment pins 154a, 154b within the alignment pin openings 156a, 156b. When the multi-fiber fiber optic connector 100 is configured as a female fiber optic connector, the ferrule alignment pins 154a, 154b are not present within the alignment pin openings 156a, 156b such that when the female fiber optic connector is mated with a corresponding male fiber optic connector, the ferrule alignment pins of the male fiber optic connector can be received within the alignment pin openings 156a, 156b to provide alignment between the multi-fiber ferrules of the mated fiber optic connectors.

The ferrule assembly 108 additionally includes a ferrule boot 162 that is assembled within the rear end of the multi-fiber ferrule 142. The ferrule boot 162 is configured for receiving the optical fibers that are routed into the multi-fiber ferrule 142 from the cable to which the multi-fiber fiber optic connector 100 is terminated. For example, the ferrule boot 162 can define a through passage for receiving optical fibers routed into the multi-fiber ferrule 142 from the optical cable to which the multi-fiber fiber optic connector 100 is terminated/mounted.

In the example, the ferrule assembly 108, the ferrule biasing spring 110, and the rear spring stop 112 are all loaded into the connector body 102 through the rear end 106 of the connector body 102. The ferrule biasing spring 110 has a front end that seats against the pin retention structure 158 and a rear end that abuts against a spring seat 164 of the rear spring stop 112.

It is appreciated that the pin retention structure 158 of the ferrule assembly 108 includes structure for selectively retaining the ferrule alignment pins 154a, 154b within the alignment pin openings 156a, 156b. In the example, at least a portion of the pin retention structure 158 is accessible from outside the multi-fiber fiber optic connector 100 to allow the ferrule alignment pins 154a, 154b to be released from the alignment pin openings 156a, 156b and convert the multi-fiber fiber optic connector 100 from a male configuration to a female configuration as required or desired. Thus, the pin retention structure 158 preferably includes retaining elements or structures that are movable between retaining positions and release positions. In the examples described herein, retaining structures can include resilient or spring-like structures that are inherently spring biased toward the retaining positions and that can be moved to the released positions by means such as a tool 166. The tool 166 can be inserted at least partially into the multi-fiber fiber optic connector 100 and access the pin retention structure 158 without requiring disassembly of the multi-fiber fiber optic connector 100.

In the example, the multi-fiber fiber optic connector 100 defines one or more tool paths 168 that enable the tool 166 to access the pin retention structure 158 from outside of the connector body 102 and when the connector 100 is assembled. The tool path 168 is at least partially defined by a tool access opening 170 defined in the connector body 102. The tool access opening 170 is defined on at least one of the upper and lower major sides 116a, 116b of the connector body 102 and substantially orthogonal to the longitudinal axis 120. In the example, both the upper and lower major sides 116a, 116 of the connector body 102 have the tool access opening 170 and the opening 170 is centered between the left and right minor sides 118a, 118b of the connector body 102. Additionally, the tool access opening 170 can be disposed within the longitudinal key mounting slots 140a, 140b defined within the connector body 102. By having the tool paths 168 and access openings 170 on both the top and bottom of the connector 100, access is enabled to the pin retention structure 158 no matter what its upper/lower orientation is within the connector body 102.

The main grip-sleeve body 124 is mounted rearward of the tool access openings 170 so that the tool paths 168 are accessible and uncovered when the main grip-sleeve body 124 is in both the forward position and the rearward position. As such, the main grip-sleeve body 124 is not required to be moved for using the tool 166 to convert the multi-fiber fiber optic connector 100 from a male configuration to a female configuration. In some examples, the front end 134 of the main grip-sleeve body 124 may include a recess 172 defined on one or both of the upper and lower major sides 130a, 130b. The recess 172 may form a portion of the tool path 168 so as to facilitate tool access and clearance while the main grip-sleeve body 124 is in the forward position and as shown in FIG. 1.

When the multi-fiber fiber optic connector 100 includes one or more of the keys 138a, 138b, the tool path 168 can extend through a key opening 174 defined by the key 138 mounted to the connector body 102. By defining the keys 138a, 138b with the key opening 174 that aligns with the tool access openings 170 in the connector body 102, the tool paths 168 remains accessible and uncovered when the multi-fiber fiber optic connector 100 is in any polarity configuration.

In the example, the tool paths 168 and the accompanying openings are substantially circular in shape and accommodate a substantially cylindrically shaped tool 166. Additionally or alternatively, the tool path and tool can have any other shape and/or size as required or desired to enable the gender change functionality as described herein. As described further below, only a single tool path location is needed on the multi-fiber fiber optic connector 100 for accessing the pin retention structure 158 and releasing the ferrule alignment pins 154a, 154. As such, performance of the multi-fiber fiber optic connector 100 is increased. However, upper and lower tools paths 168 may be formed in the connector 100 so as to increase manufacturing efficiencies of the connector 100.

Figure 4:
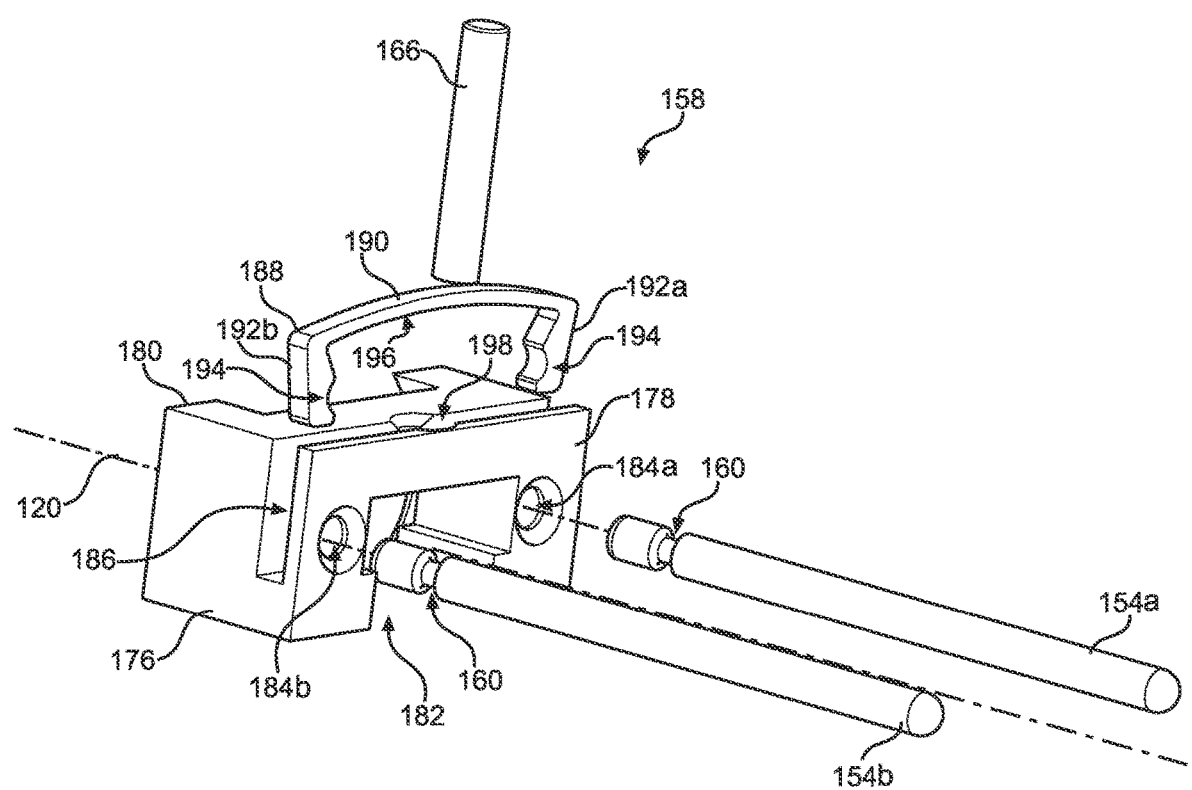
FIG. 4 depicts an exploded view of a pin retention structure of the multi-fiber fiber optic connector of FIG. 1.

FIG. 4 depicts an exploded view of the pin retention structure 158 of the multi-fiber fiber optic connector 100 (shown in FIGS. 1-3). The pin retention structure 158 is adapted to secure the ferrule alignment pins 154a, 154b within the alignment pin openings 156a, 156b of the multi-fiber ferrule 142 (shown in FIGS. 1-3), and can be released to allow removal of the alignment pins 154a, 154b from the alignment pin openings 156a, 156b.

The pin retention structure 158 includes a pin-holder body 176 having a front end 178 and an opposite rear end 180 such that the body 176 extends along the longitudinal axis 120. The pin-holder body 176 is generally U-shaped and can have a molded, dielectric (e.g., plastic) construction as required or desired. The front end 178 is configured to be disposed adjacent the rear end 146 of the multi-fiber ferrule 142 (shown in FIG. 3) and the ferrule boot 162 (shown in FIG. 3) can extend axially through an open central region 182 of the pin-holder body 176. Left and right pin receiver openings 184a, 184b are defined in the front end 178 of the pin-holder body 176 extending towards the rear end 180 along the longitudinal axis 120 and are adapted for receiving the rear ends of the ferrule alignment pins 154a, 154b. The left and right pin receiver openings 184a, 184b are positioned on opposite sides of the open central region 182 of the pin-holder body 176. When the multi-fiber fiber optic connector 100 is assembled, the left and right pin receiver openings 184a, 184b align co-axially with the left and right alignment pin openings 156a, 156b of the multi-fiber ferrule 142 so that the rear ends of the ferrule alignment pins 154a, 154b can be received within the pin-holder body 176. In some examples, the pin receiver openings 184a, 184b can include a counter-bore at the front end 178 of the pin-holder body 176 to facilitate receiving the rear ends of the alignment pins 154. The pin-holder body 176 fits tightly around the ferrule boot 162 so as to keep the openings 184, 156 aligned when no ferrule alignment pins 154 are installed.

Additionally, a slot 186 is defined within the pin-holder body 176 proximate the front end 178 and opening upwards. The slot 186 extends transversely across the pin-holder body 176 and substantially orthogonal relative to the longitudinal axis 120. In the example, the pin receiver openings 184a, 184b extend through the slot 186 so that the openings 184 are defined on both axial sides of the slot 186. The pin receiver openings 184a, 184b and the slot 186 are in communication such that the rear ends (e.g., the grooves 160) of the ferrule alignment pins 154a, 154b are accessible via the slot 186. The slot 186 is sized and shaped to receive a U-shaped spring clip 188 that is configured to retain the left and right ferrule alignment pins 154a, 154b.

The pin retention structure 158 also includes the U-shaped spring clip 188 disposed within the slot 186 of the pin-holder body 176. The spring clip 188 includes a base portion 190 and left and right legs 192a, 192b that form a unitary U-shape. The base portion 190 extends in a direction that is along the major dimension 148 of the multi-fiber ferrule 142 (shown in FIG. 2) and the left and right legs 192a, 192b extend in a direction that is along the minor dimension 150 of the multi-fiber ferrule 142 (shown in FIG. 2). The free ends of the left and right legs 192*a*, 192*b* include pin retaining portions 194 configured to engage with the circumferential grooves 160 of the ferrule alignment pins 154*a*, 154*b*. The pin retaining portions 194 are depicted as inward projections/tabs at the left and right legs 192*a*, 192*b*. The pin retaining portions 194 align with the left and right pin receiver openings 184*a*, 184*b* and are positioned laterally outside the openings 184*a*, 184*b*. The base portion 190 is bowed (e.g., curved) with a concave surface 196 facing the longitudinal axis 120. The base portion 190 is shaped to form the primary resilient flex location for the U-shaped spring clip 188.

Figure 5:
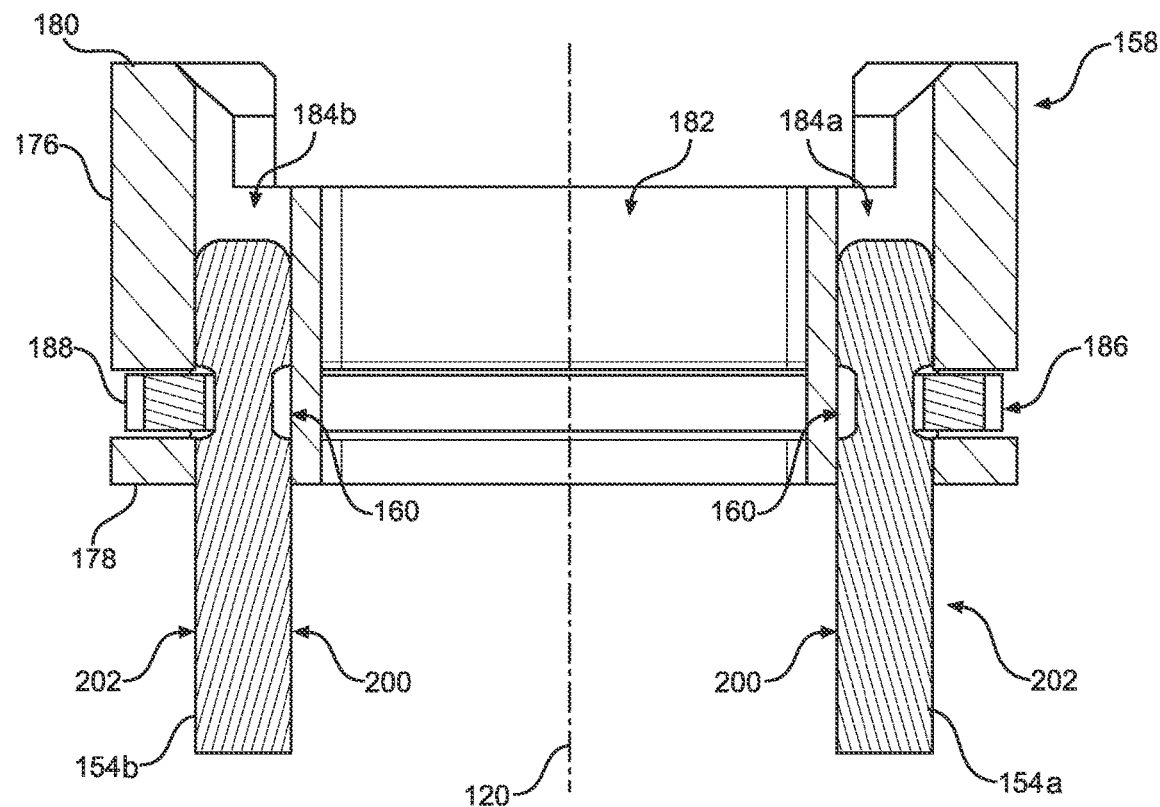
FIG. 5 is a cross-sectional view cut along a horizontal plane through the pin retention structure of the multi-fiber fiber optic connector of FIG. 1.
Figure 6:
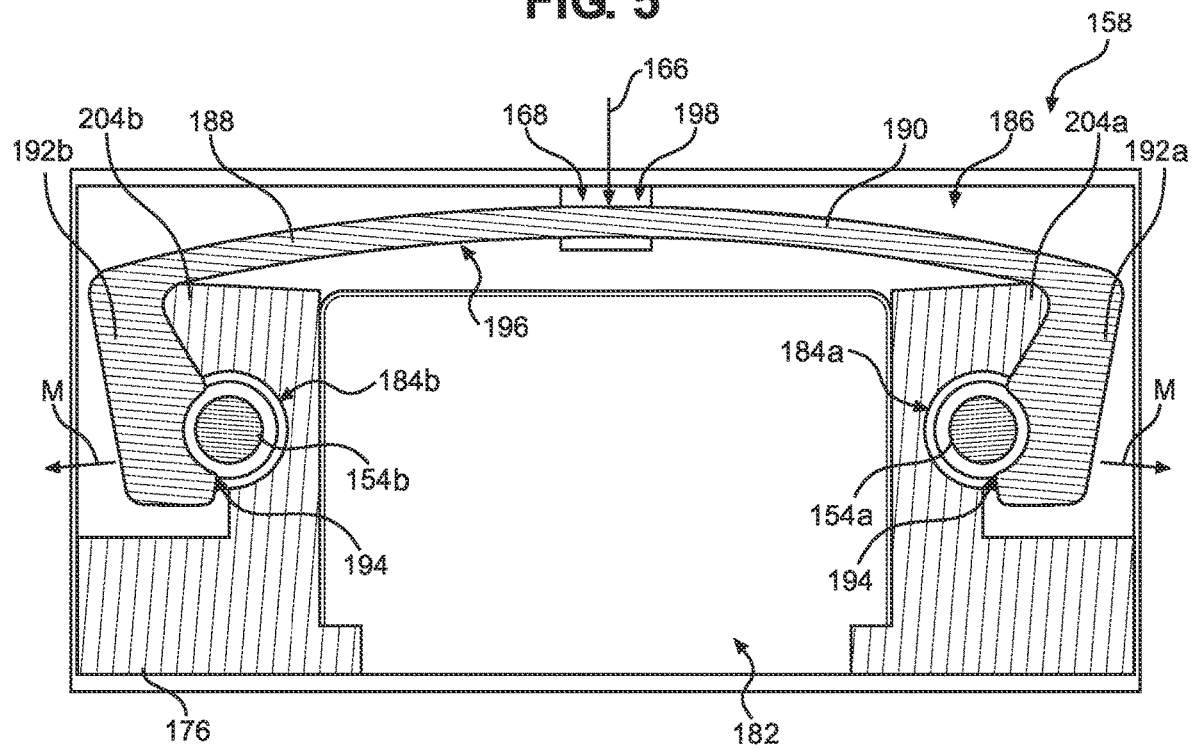
FIG. 6 is a cross-sectional view cut along a vertical plane through the pin retention structure of the multi-fiber fiber optic connector of FIG. 1.

The U-shaped spring clip 188 is movable relative to the pin-holder body 176 between a pin retaining position (shown in FIGS. 5 and 6) and a pin release position (schematically illustrated with arrows M in FIG. 6). In the pin retaining position, the base portion 190 is bowed and positioned outwardly relative to the longitudinal axis 120. Additionally, the pin retaining portions 194 of the left and right legs 192*a*, 192*b* fit within the circumferential retention grooves 160 of the ferrule alignment pins 154*a*, 154*b* to prevent the ferrule alignment pins 154*a*, 154*b* from being removed from the alignment pin openings 156*a*, 156*b* of the multi-fiber ferrule 142. In the pin release position, the base portion 190 flexes inwardly relative to the longitudinal axis 120 such that the pin retaining portions 194 are displaced from the circumferential retention grooves 160 of the ferrule alignment pins 154*a*, 154*b*, and the ferrule alignment pins 154*a*, 154*b* can be removed from the alignment pin openings 156*a*, 156*b* of the multi-fiber ferrule 142 without interference from the pin retaining portions 194. The U-shaped spring clip 188 is biased in a direction toward the pin retaining position.

In the example, to move the U-shaped spring clip 188 towards the pin release position, the tool 166 can be inserted at least partially into the tool path 168 (shown in FIG. 2) defined within the multi-fiber fiber optic connector 100. When the connector 100 is assembled, a portion of the base portion 190 is positioned within the tool path 168 such that the tool 166 can engage with the U-shaped spring clip 188 and flex the base portion 190. In the example, the tool path 168 may include a counter-bore 198 defined within the pin-holder body 176 and at the slot 186 so that the tool 166 can reach the U-shaped spring clip 188 disposed within the slot 186 and provide further flexure distance. In this example, the thickness of the tool 166 may be greater than the thickness of the slot 186 along the longitudinal axis 120 so that the tool 166 cannot be fully inserted into the slot 186.

FIG. 5 is a cross-sectional view cut along a horizontal plane through the pin retention structure 158 of the multi-fiber fiber optic connector 100 (shown in FIGS. 1-3). FIG. 6 is a cross-sectional view cut along a vertical plane through the pin retention structure 158. Certain components are described above, and thus, are not necessarily described further below. Referring concurrently to FIGS. 5 and 6, the U-shaped spring clip 188 is in its pin retaining position so that the left and right ferrule alignment pins 154*a*, 154*b* are retained in the pin retention structure 158. As described above, the pin retention structure 158 includes the pin-holder body 176 that houses the spring clip 188 within the slot 186. The pin receiver openings 184*a*, 184*b* extend along the longitudinal axis 120 within the pin-holder body 176 so that the ferrule alignment pins 154*a*, 154*b* can be mounted therein. In an example, the pin receiver openings 184*a*, 184*b* may extend completely through the pin-holder body 176 from the front end 178 to the rear end 180.

The ferrule alignment pins 154*a*, 154*b* have inner surfaces 200 that face toward each other and toward the longitudinal axis 120, and outer surfaces 202 that face away from each other and away from the longitudinal axis 120. In the pin retaining position, the left and right legs 192*a*, 192*b* of the U-shaped spring clip 188 insert within the circumferential grooves 160 of the ferrule alignment pins 154*a*, 154*b* at the outer surfaces 202 of the alignment pins 154*a*, 154*b*. To disengage the left and right legs 192*a*, 192*b* from the circumferential grooves 160, it is necessary to flex the base portion 190 inwardly towards the longitudinal axis 120 (e.g. via the tool 166 shown schematically by an arrow) so as to move M the left and right legs 192*a*, 192*b* outwardly away from the longitudinal axis 120 and disengage with the outer surfaces 202 of the ferrule alignment pins 154*a*, 154*b*. This outward direction is towards the left and right minor sides 118*a*, 118*b* of the connector body 102 (shown in FIG. 3). In certain examples, the U-shaped spring clip 188 is completely disposed within the pin-holder body 176 in both the pin retaining position and the pin release position.

It will be appreciated that the tool 166 can be used from outside the multi-fiber fiber optic connector 100 and through the tool path 168 to apply flexing release forces to the base portion 190 of the U-shaped spring clip 188 and move the left and right legs 192*a*, 192*b* from the retaining positions to the release positions. As described above, the main grip-sleeve body 124 (shown in FIG. 1) is not required to be retracted for access to the tool path 168. The base portion 190 is aligned within the tool path 168 so that the tool 166 can be inserted directly through the connector body 102 and/or key 138 to engage the base portion 190. In certain examples, the apex of the concave surface 196 may be aligned within the tool path 168. As such, the tool 166 can push and flex the base portion 190 inwardly and against the bias of the U-shaped spring clip 188 to correspondingly move the left and right legs 192*a*, 192*b* outwardly to the release position so that the ferrule alignment pins 154*a*, 154*b* can be removed by pulling the pins forward. It is appreciated that the tool 166 can engage a single location on the U-shaped spring clip 188 to move both the left and right legs 192*a*, 192 substantially simultaneously to release the left and right ferrule alignment pins 154*a*, 154*b*.

In the example, the connector body 102 defines the tool path 168 that is defined through and centered on the upper major side 116*a* of the connector body 102 (shown in FIG. 2). As such, the base portion 190 extends along the upper major side 116*a* of the connector body 102. Additionally or alternatively, the tool path 168 and the base portion 190 may be positioned on a lower major side 116*b* of the connector body 102 as required or desired. In the example, and as described above, tool paths 168 are defined on both the upper and lower major sides 116, 116*b* so that the orientation of the pin retention structure 158 does not matter and manufacturing efficiencies are increased. In some examples, the flexing of the U-shaped spring clip 188 may be along a plane that is substantially orthogonal to the longitudinal axis 120 (e.g., a vertical plane as illustrated in FIG. 6). Furthermore, flexing of the base portion 190 includes flattening or increasing the radius of the concave surface 196. As such, the apex of the base portion 190 decreases its offset distance along the vertical plane from the alignment pins 154 along the minor dimension 150 when moving from a pin retaining position to the pin release position. The flexing movement of the base portion 190, however, moves the pin retaining portions 194 in a different direction and out and away from the longitudinal axis 120.

As illustrated in FIG. 6, the pin-holder body 176 includes left and right shoulders 204a, 204b disposed within the slot 186 and that support the U-shaped spring clip 188. The left and right shoulders 204a, 204b engage with inner corners of the U-shaped spring clip 188 between the respective leg 192a, 192b and the base portion 190. The shoulders 204a, 204b form pivot points for the left and right legs 192a, 192b to pivot about when moving between the pin retaining position and the pin release position. This pivoting movement of the legs 192a, 192b is induced by the inward flexing of the base portion 190 and results in the pin retaining portions 194 moving in an outward direction to release the ferrule alignment pins 154a, 154b. In certain examples, the radius of the concave surface 196 corresponds to the movement M of the legs 192 during flexure of the base portion 190.

To load one of the ferrule alignment pins 154 of the type disclosed herein into one of the ferrule alignment pin openings 156 of the type disclosed herein, the alignment pin 154 is inserted rearwardly into the alignment pin openings 156. During the insertion process, the rear end of the alignment pin 154 engages the pin retaining portion 194 of the corresponding leg 192 of the U-shaped spring clip 188 thereby forcing the leg 192 to flex from the pin retaining position to the pin release position. Alternatively, the tool 166 can be used to move the leg 192 from the pin retaining portion to the pin release position via the tool path 168. With continued rearward insertion of the alignment pin 154, the rear end of the pin 154 moves past the pin retaining portion 194 and the pin retaining portion 194 engages and slides along the outer surface 202 of the pin 154 such that the outer surface 202 of the pin 154 holds the pin retaining portion 194 in the pin release position. When the circumferential groove 160 of the alignment pin 154 moves into alignment with the pin retaining portion 194 of the leg 192, the pin retaining portion 194 snaps into the circumferential groove 160, and thereby, moves from pin release position to the pin retaining position such that the alignment pin 154 is locked/retained within the ferrule assembly 108 (shown in FIG. 3). The movement of the U-shaped spring clip 188 from the pin retaining position to the pin release position is caused by the inherent elasticity/resiliency of the spring clip 188. To release/unlock the alignment pin 154 from the pin retention structure 158 so as to allow removal of the alignment pin 154 from the multi-fiber ferrule 142, the tool 166 can be used to move the pin retaining portion 194 from the pin retaining position to the pin release position. With the pin retaining portion 194 held in the release position, the alignment pin 154 can be pulled forwardly out of the multi-fiber fiber optic connector 100.

In the pin retention structure 158 described herein, the tool 166 can be used to move the U-shaped spring clip 188 from the pin retaining position to the pin release position without requiring the fiber optic connector 100 to be disassembled or to be moved into a specific configuration. In an aspect, the U-shaped spring clip 188 is completely disposed within the pin-holder body 176 in both the pin retaining position and the pin release position. In certain examples, tool access openings for access to the U-shaped spring clip 188 are defined though major sides of the connector body 102 of the fiber optic connector. The tool access openings are exposed when the main grip-sleeve body 124 (shown in FIGS. 1-3) is in a rear position relative to the connector body 102, and are exposed when the main grip-sleeve body 124 is in a forward position relative to the connector body 102. The U-shaped spring clip 188 engages with the outer surface 202 of the ferrule alignment pins 154, and the open tool path 168 is offset from each of the pins 154 and substantially centered on the multi-fiber fiber optic connector 100. This enables for a single tool 166 component (e.g., an elongated cylindrical shaft) to be used for changing the gender of the multi-fiber fiber optic connector 100.

What is claimed is:

1. A fiber optic connector comprising:
a connector body having a front end, a rear end, opposing major sides, and opposing minor sides, the connector body defining a longitudinal axis extending between the front end and the rear end;
a multi-fiber ferrule disposed within the connector body and biased towards the front end of the connector body, the multi-fiber ferrule including a front end, a rear end, a plurality of fiber openings for receiving optical fibers, and a pair of alignment pin openings that extend between the front end and the rear end;
a main grip-sleeve body mounted on the connector body and movable relative to the connector body along the longitudinal axis between a forward position and a rearward position;
a pair of alignment pins selectively mountable in the pair of alignment pin openings of the multi-fiber ferrule, each alignment pin has a circumferential groove defined adjacent a rear end of the alignment pin; and
a pin retention structure disposed within the connector body and positioned at the rear end of the multi-fiber ferrule, the pin retention structure configured to retain the pair of alignment pins within the pair of alignment pin openings, the pin retention structure comprising:
a pin-holder body having a front end disposed adjacent the rear end of the multi-fiber ferrule and a pair of pin openings extending from the front end for receiving the rear ends of the pair of alignment pins; and
a U-shaped spring clip disposed within the pin-holder body, the spring clip including a base portion and two opposing legs extending from the base portion, the spring clip movable relative to the pin-holder body between a pin retaining position and a pin release position, wherein when the spring clip is in the pin retaining position, the base portion is bowed such that a concave surface faces the longitudinal axis, and the two opposing legs engage with outer sides of each of the alignment pins relative to the longitudinal axis and at the circumferential groove, and wherein when the spring clip is in the pin release position the base portion flexes inwardly towards the longitudinal axis, and the two opposing legs disengage with the outer sides of each of the alignment pins.

2. The fiber optic connector of claim 1, wherein the pin-holder body further includes a slot proximate the front end of the pin-holder body, and a pair of shoulders are disposed within the slot, and wherein the pair of shoulders form pivot points for the two opposing legs of the spring clip when moving between the pin retaining position and the pin release position.

3. The fiber optic connector of claim 1, wherein the spring clip is biased toward the pin retaining position.

4. The fiber optic connector of claim 1, wherein the spring clip is completely disposed within the pin-holder body in both the pin retaining position and the pin release position.

5. The fiber optic connector of claim 1, wherein at least one of the major sides of the connector body defines a tool access opening that is aligned with at least a portion of the base portion of the spring clip when disposed within the connector body.

6. The fiber optic connector of claim 5, wherein the tool access opening is centered between the minor sides of the connector body.

7. The fiber optic connector of claim 5, wherein at least one of the major sides of the connector body includes a key mounting slot extending from the front end and along the longitudinal axis, the key mounting slot configured to selectively receive a key that defines a polarity of the fiber optic connector, and wherein the tool access opening is disposed within the key mounting slot.

8. The fiber optic connector of claim 7, further comprising the key, wherein the key defines a key opening configured to align with the tool access opening.

9. The fiber optic connector of claim 5, wherein the tool access opening is accessible when the main grip-sleeve body is in both the forward position and the rearward position.

10. The fiber optic connector of claim 1,
wherein at least one of the opposing major sides defines a tool access opening that at least partially defines a tool path, and wherein
the base portion of the U-shaped spring clip is at least partially disposed within the tool path and flexes inwardly towards the longitudinal axis upon inserting a tool within the tool path to move the two opposing legs to the pin release position and in a direction away from the longitudinal axis and towards the minor sides of the connector body.

11. The fiber optic connector of claim 10, wherein the tool path is approximately centered between the opposing minor sides, and is substantially orthogonal to the longitudinal axis.

12. The fiber optic connector of claim 1, wherein the pin-holder body defines a slot that receives the spring clip, and wherein the pair of pin openings extend through the slot.

13. The fiber optic connector of claim 1, further comprising:
a spring stop mounted within the rear end of the connector body;
a ferrule spring for biasing the multi-fiber ferrule in a forward direction relative to the connector body, the ferrule spring being located within the connector body and being captured between the spring stop and the multi-fiber ferrule; and
wherein the spring clip biased toward the pin retaining position, left and right legs of the two opposing legs being positioned and configured to fit within the circumferential grooves of the pair of alignment pins when the alignment pins are installed within the pair of alignment pin openings, the left and right legs being adapted to fit within the circumferential grooves at the outer surfaces of the alignment pins, the base portion being positioned outwardly relative to the longitudinal axis, wherein the base portion flexes inwardly relative to the longitudinal axis to move the left and right legs from the pin retaining position to the pin release position and outwardly relative to the longitudinal axis.

14. The fiber optic connector of claim 13, wherein the pin-holder body includes a front end, a rear end, and a slot proximate the front end that receives the spring clip.

15. The fiber optic connector of claim 14, wherein the pin-holder body includes a pair of shoulders disposed within the slot, the pair of shoulders engage with inner corners of the U-shaped spring clip, wherein the left and right legs pivot about the pair of shoulders when moving between the pin retaining position and the pin release position.

16. The fiber optic connector of claim 1, wherein the fiber optic connector includes a tool path extending from a tool access opening defined by one of the upper or lower major sides of the connector body to the base portion of the spring clip.

17. The fiber optic connector of claim 16, wherein the tool path extends through a key opening defined by a key mounted to the connector body.

18. The fiber optic connector of claim 16, wherein the tool path includes a counter-bore within the pin-holder body.

19. The fiber optic connector of claim 16, wherein the tool path is uncovered when the main grip-sleeve body is in the forward position and the rearward position.

* * * * *